United States Patent
Lauterbach et al.

(10) Patent No.: US 7,925,802 B2
(45) Date of Patent: Apr. 12, 2011

(54) HARDWARE-BASED VIRTUALIZATION OF BIOS, DISKS, NETWORK-INTERFACES, AND CONSOLES USING A DIRECT INTERCONNECT FABRIC

(75) Inventors: Gary Lauterbach, Los Altos, CA (US); Anil Rao, Cupertino, CA (US)

(73) Assignee: SeaMicro Corp., Santa Clara, CA (US)

( * ) Notice: Subject to any disclaimer, the term of this patent is extended or adjusted under 35 U.S.C. 154(b) by 414 days.

(21) Appl. No.: 12/136,711

(22) Filed: Jun. 10, 2008

(65) Prior Publication Data
US 2008/0320181 A1    Dec. 25, 2008

Related U.S. Application Data

(60) Provisional application No. 60/936,513, filed on Jun. 21, 2007.

(51) Int. Cl.
G06F 3/00 (2006.01)
G06F 5/00 (2006.01)

(52) U.S. Cl. ............................................. 710/38
(58) Field of Classification Search ...................... 710/38
See application file for complete search history.

(56) References Cited

U.S. PATENT DOCUMENTS

| | | | |
|---|---|---|---|
| 5,603,059 A | 2/1997 | Churchill et al. | |
| 5,970,066 A | 10/1999 | Lowry et al. | |
| 6,105,122 A | 8/2000 | Muller et al. | |
| 6,230,252 B1 * | 5/2001 | Passint et al. | 712/12 |
| 6,401,140 B1 | 6/2002 | Wu | |
| 6,629,166 B1 | 9/2003 | Grun | |
| 6,892,332 B1 * | 5/2005 | Gulick | 714/55 |
| 7,051,147 B2 | 5/2006 | Hoese et al. | |
| 7,171,495 B2 | 1/2007 | Matters et al. | |
| 7,219,183 B2 * | 5/2007 | Pettey et al. | 710/316 |
| 7,328,284 B2 * | 2/2008 | Rimmer | 709/250 |
| 2002/0083120 A1 | 6/2002 | Soltis | |
| 2003/0130832 A1 | 7/2003 | Schulter | |
| 2004/0114531 A1 * | 6/2004 | Tucker et al. | 370/252 |
| 2006/0161719 A1 | 7/2006 | Bennett et al. | |
| 2006/0253619 A1 * | 11/2006 | Torudbakken et al. | 710/31 |
| 2007/0061441 A1 | 3/2007 | Landis et al. | |
| 2007/0097950 A1 | 5/2007 | Boyd et al. | |
| 2007/0106833 A1 | 5/2007 | Rankin et al. | |
| 2007/0143395 A1 * | 6/2007 | Uehara et al. | 709/203 |
| 2008/0005297 A1 | 1/2008 | Kjos et al. | |
| 2008/0022071 A1 * | 1/2008 | Reid | 712/206 |

* cited by examiner

Primary Examiner — Henry W Tsai
Assistant Examiner — Eric T Oberly
(74) Attorney, Agent, or Firm — Stuart T. Auvine; gPatent LLC

(57) ABSTRACT

A multi-computer system has many processors that share peripherals. The peripherals are virtualized by hardware without software drivers. Remote peripherals appear to the operating system to be located on the local processor's own peripheral bus. A processor, DRAM, and north bridge connect to a south bridge interconnect fabric chip that has a virtual Ethernet controller and a virtual generic peripheral that act as virtual endpoints for the local processor's peripheral bus. Requests received by the virtual endpoints are encapsulated in interconnect packets and sent over an interconnect fabric to a device manager that accesses remote peripherals on a shared remote peripheral bus so that data can be returned. Ethernet Network Interface Cards (NIC), hard disks, consoles, and BIOS are remote peripherals that can be virtualized. Processors can boot entirely from the remote BIOS without additional drivers or a local BIOS. Peripheral costs are reduced by sharing remote peripherals.

20 Claims, 9 Drawing Sheets

HARDWARE-BASED VIRTUALIZATION OF BIOS, DISKS, NETWORK-INTERFACES, AND CONSOLES USING A DIRECT INTERCONNECT FABRIC

RELATED APPLICATION

This application is a non-provisional of the co-pending provisional application for "Computer System with Networked Virtual I/O and Memory", U.S. Ser. No. 60/936,513, filed Jun. 21, 2007.

FIELD OF THE INVENTION

This invention relates to computer systems, and more particularly to virtualized I/O and memory on multi-processor systems.

BACKGROUND OF THE INVENTION

Computer systems have enjoyed immense popularity and versatility in part due to the ability to connect to and control a wide variety of input-output (I/O) peripheral devices. FIG. 1 shows a typical uni-processor computer system. Central Processing Unit (CPU) 10 is a processor that executes instructions and processes data that may be cached in cache 12. North bridge 14 connects CPU 10 with a main memory of Dynamic Random-Access Memory (DRAM) 18. South bridge 16 connects to peripheral bus 28, which could be a Peripheral Components Interconnect (PCI), PCI express bus, Serial AT Attachment (SATA) bus, or some other bus that accepts expansion cards or expansion devices.

A variety of I/O devices can be attached to peripheral bus 28. Ethernet 20 is a Network Interface Card (NIC) that couples the local computer to an external network over a physical medium such as a cable. Hard disk 22 is a rotating hard disk using a standard interface such as SATA or Integrated Device Electronics (IDE). Sectors of data and instruction code are read from hard disk 22 and copied into DRAM 18 for use by CPU 10.

Basic Input Output System (BIOS) 24 is a non-volatile read-only memory (ROM) that contains the first sequence of instructions executed by CPU 10 after powering on or rebooting. Other basic system routines may be contained in BIOS 24 and executed directly, or copied to DRAM 18 for faster execution by CPU 10 (shadow ROM).

Console 26 may be a serial port to an external logging or display device. Status information may be written to console 24 by CPU 10 during operation to allow for debugging or status checks of the system.

The rapid and continual decrease in cost and increase in complexity of silicon devices has allowed for multiple processors to be used in place of CPU 10. Furthermore, multiple computer systems may be connected together at a local node of a network and operate together as a multi-processing system. FIG. 2 shows a multi-processing system that shares part of a BIOS.

First computer 30 contains CPU 10, cache 12, north bridge 14, south bridge 16, DRAM 18, and local peripheral bus 28 that connects to Ethernet card 20, local hard disk 22, and boot-loader BIOS 24'. Remote computer 30' contains CPU 10', cache 12', north bridge 14', south bridge 16' and remote peripheral bus 28' that connects to Ethernet card 20', and remote BIOS 32.

First computer 30 and remote computer 30' are connected together by network 34, which may be an Ethernet or other network connection. Ethernet cards 20'' are other computers or Ethernet devices on network 34.

First computer 30 may be booted remotely using network 34. CPU 10 initially reads instructions from boot-loader BIOS 24', including a boot-loader program that is copied into DRAM 18 and executed by CPU 10. This boot-loader program initializes Ethernet card 20, allowing packets to be sent and received from network 34. The boot-loader program sends packets over network 34 to remote computer 30', where Ethernet card 20' receives the packet and sends the encapsulated request to CPU 10'. CPU 10' decodes the request from first computer 30 and reads boot code from remote BIOS 32. This remote boot code is sent from remote BIOS 32 over network 34 by Ethernet card 20'. Ethernet card 20 on first computer 30 receives packets containing the remote boot code read from remote BIOS 32 and loads the remote boot code into DRAM 18. CPU 10 can then execute the remote boot code, allowing booting to continue.

Thus remote booting is achieved by using a local BIOS (boot-loader BIOS 24') and a remote BIOS (remote BIOS 32). This has the advantage of allowing for a smaller, cheaper ROM in first computer 30. Many computers on network 34 can share remote BIOS 32, reducing overall costs in a large network or enterprise.

Some systems may share Ethernet cards rather than share BIOS. Virtualized I/I is sometimes facilitated by changes to software. For example, special software drivers may be used to redirect or reformat network accesses. However, since the software must be changed, this kind of virtual I/O is not transparent.

What is desired is hardware-based virtualization of I/O that is transparent to the operating system and other software running on a computer. A generic virtualization scheme that can virtualize many kinds of peripheral devices is desired, rather than just virtualizing one or two kinds of peripheral devices. A universal virtualization device based in hardware is desired that can virtualize any kind of peripheral device. It is desired to transparently virtualize peripherals such as Network Interface cards, Ethernet cards, hard disks, BIOS, and consoles. It is also desired to virtualize the entire BIOS so that a local boot-loader is not required.

DETAILED DESCRIPTION

The present invention relates to an improvement in virtualized peripherals in a multi-node computer system. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that an interconnect fabric can be inserted between processors and main memory, and peripheral devices. An interconnect interface device connects each processor and its main memory to the interconnect fabric, while a device manager connects a remote peripheral bus to the interconnect fabric. The remote peripheral bus can connect to Ethernet cards, hard disks, BIOS, and consoles. The processors may share the peripheral devices on the remote peripheral bus.

The remote peripheral are transparently virtualized by the hardware of the interconnect device and device manager, and can be remotely shared using the interconnect fabric. Since hardware devices connect through the interconnect fabric, virtualization is transparent to software and the operating systems.

Figure 3:
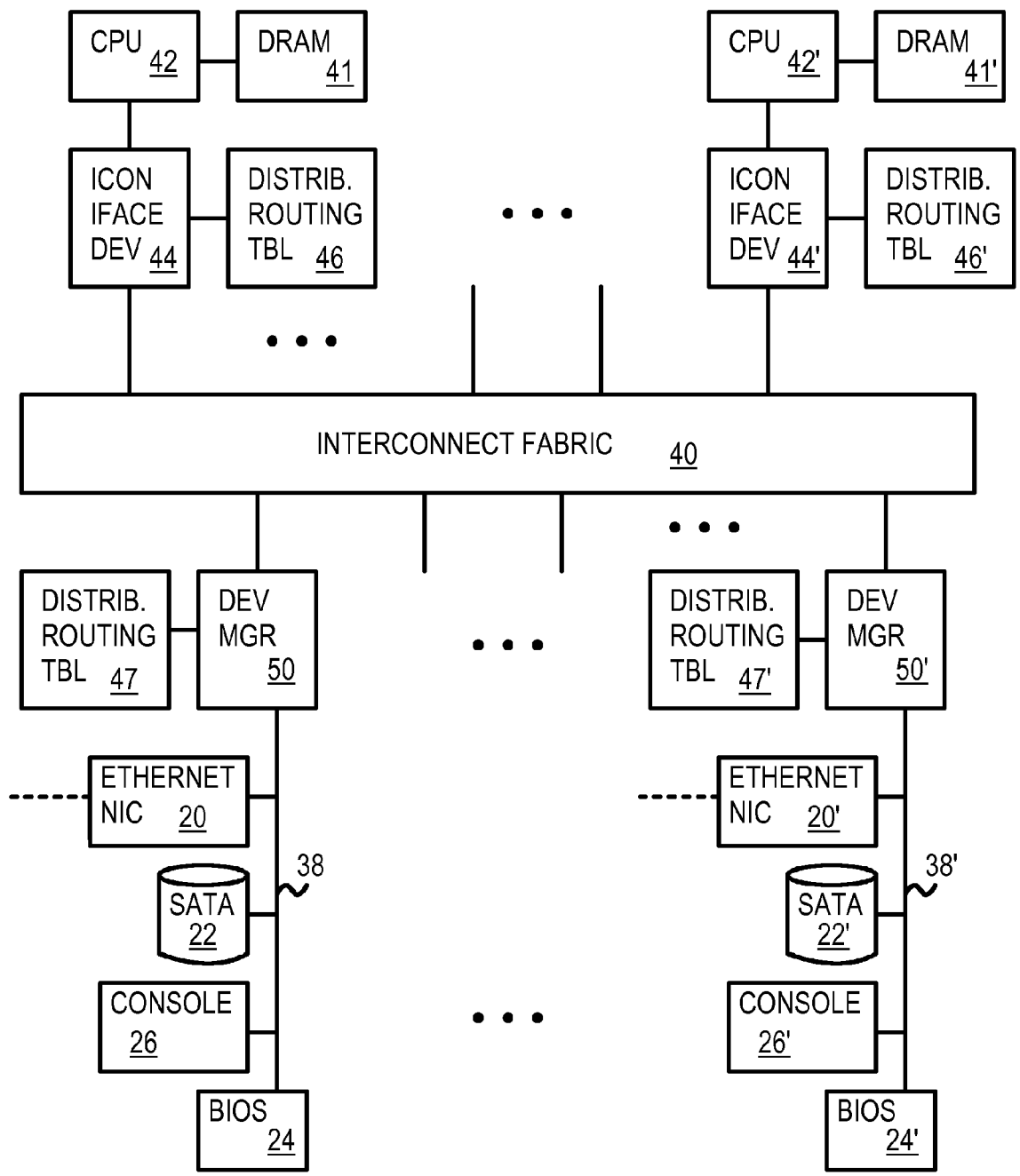
FIG. 3 shows multiple compute nodes that share virtualized peripherals that connect through an interconnect fabric.

FIG. 3 shows multiple compute nodes that share virtualized peripherals that connect through an interconnect fabric. CPU 42 executes instructions and writes data in local DRAM 41, while CPU 42' uses its local DRAM 41'. Neither CPU 42, 42' has its own peripherals. Neither CPU 42, 42' has a local BIOS or a local network interface card (NIC). Instead, remote peripherals are shared and virtualized.

For example, both CPU 42, 42' can access a network through Ethernet card 20 on first peripheral bus 38, and can read data on hard disk 22 on first peripheral bus 38. Alternately, CPU 42, 42' could read data from hard disk 22' on second peripheral bus 38', or connect to an external network using Ethernet card 20' on second peripheral bus 38'. A backup Ethernet connection is available using Ethernet cards 20, 20' on two peripheral buses 38, 38'.

CPU 42 could write status to console 26, while CPU 42' writes its status to second console 26', or both CPU 42, 42' could write status to the same console, either first console 26 or second console 26'. Likewise, either CPU could access BIOS 24 or first hard disk 22 on first peripheral bus 38 or second BIOS 24' or second hard disk 22' on second peripheral bus 38'.

Interconnect fabric 40 connects many processing nodes with several shared peripheral buses. Each processing node has a processor, main memory, and interconnect interface device 44 that connects to interconnect fabric 40. Each shared peripheral bus 38, 38' has a number of peripheral devices, such as Ethernet 20, hard disk 22, BIOS 24, and console 26, and device manager 50 that connects to interconnect fabric 40.

Interconnect interface device 44 uses distributed routing table 46 to map addresses from local CPU 42 to a remote peripheral device. An address of one of device managers 50, 50' for a peripheral bus 38, 38' is located in a mapping entry in distributed routing table 46, or a new mapping entry is created.

Device manager 50 uses its own distributed routing table 47 to map incoming requests to one of its devices on first peripheral bus 38, and to map outgoing responses to interconnect interface device 44 for the designated one of the processing nodes. Device manager 50 adds an interconnect address for interconnect interface device 44 to the response from it peripheral device on first peripheral bus 38 when encapsulating the response data. This interconnect address is read from the mapping entry in distributed routing table 47, and identifies interconnect interface device 44 for the processing node that sent the request.

When CPU 42 boots, it sends out a memory read command with an address that normally maps to BIOS. However CPU 42 has no local BIOS. Instead, interconnect interface device 44 intercepts this memory command, encapsulates it, and sends it over interconnect fabric 40 to device manager 50. Device manager 50 extracts the read command, and sends it to BIOS 24 on first peripheral bus 38. BIOS 24 reads the booting instructions at the indicated address and sends the instructions to device manager 50, which encapsulates the instructions, and sends them over interconnect fabric 40 to interconnect interface device 44. The instructions are extracted by interconnect interface device 44 and sent to CPU 42 for execution or storage in DRAM 41.

Figure 4:
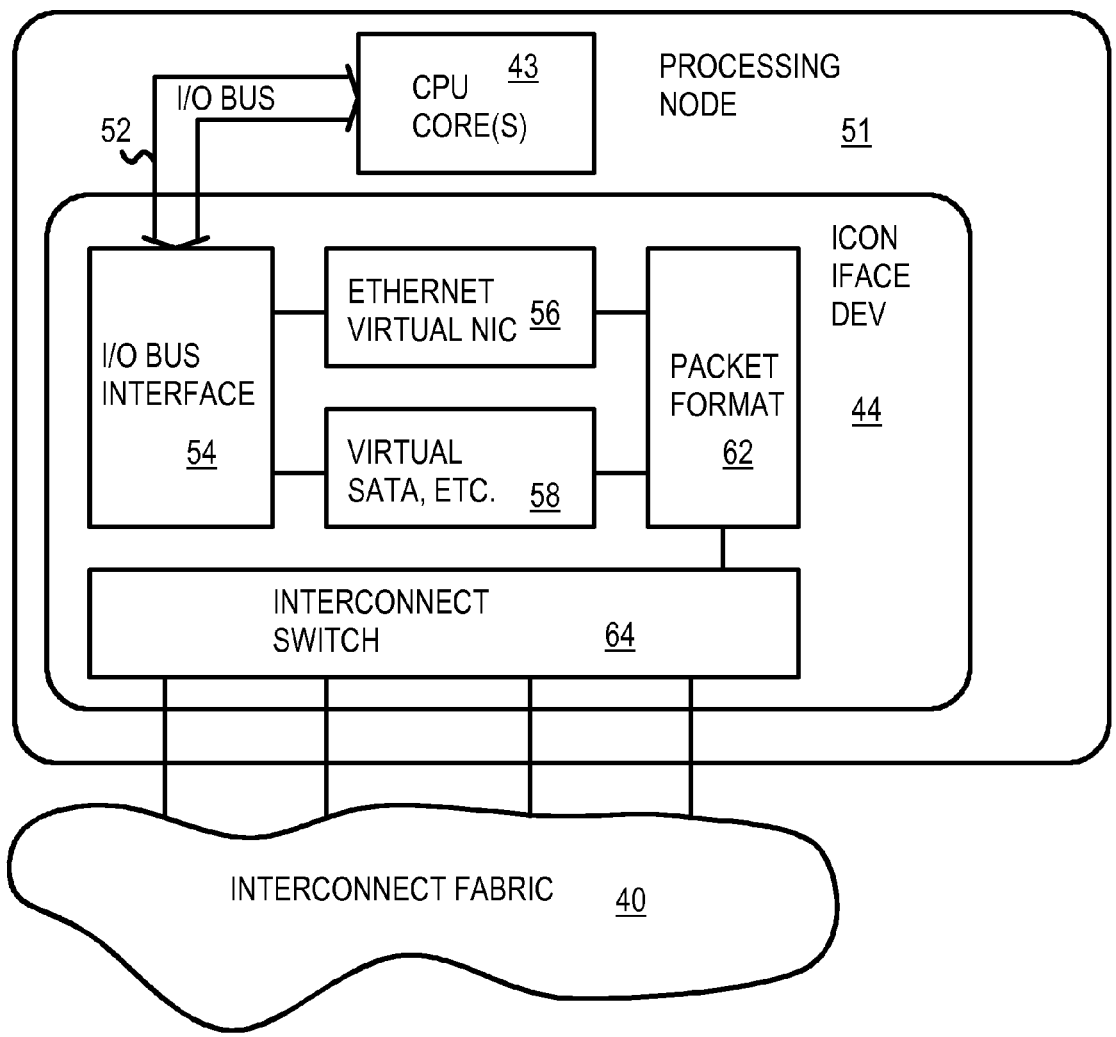
FIG. 4 highlights a processing node connected to an interconnect fabric to virtualize remote peripherals.

FIG. 4 highlights a processing node connected to an interconnect fabric to virtualize remote peripherals. Processing node 51 may include one or more CPU cores 43, each with its own CPU and local DRAM acting as its main memory. Rather than connect to local and remote peripherals, CPU cores 42 connect through local I/O bus 52 to I/O bus interface 54, which responds to all local I/O bus requests, acting as a virtual endpoint for each local CPU in CPU cores 43. The software or operating systems in CPU cores 43 do not have to be modified, since I/O bus interface 54 intercepts requests addressed to virtualized peripherals that appear to be on local I/O bus 52. The hardware of I/O bus interface 54 responds to the requests just as a local peripheral would, even though the peripheral is remotely located. Wait states may be added to account for increased delays in reaching the remote peripherals through interconnect fabric 40.

I/O bus interface 54 provides the physical interfaces to I/O bus 52, while the higher-level responses are generated by virtual Ethernet NIC 56 and by virtual generic peripheral 58. Requests sent over I/O bus 52 for an Ethernet peripheral are routed by I/O bus interface 54 to virtual Ethernet NIC 56, while all other requests are routed by I/O bus interface 54 to virtual generic peripheral 58.

Many requests require data obtained from the actual remote peripheral. These requests are forwarded by virtual Ethernet NIC 56 or virtual generic peripheral 58 to packet formatter 62, which encapsulates the request. The interconnect address of device manager 50 is obtained by interconnect interface device 44 looking up the local address from I/O bus 52 in distributed routing table 46 (FIG. 3). This interconnect address is added to the packet by packet formatter 62, and the packet is sent to local interconnect switch 64.

Local interconnect switch 64 may connect to several dimensions of connections inside interconnect fabric 40. A low-order dimension may be used when connecting to a nearby device manager 50, while higher-order dimensions may be used when connecting to more remotely located device managers 50. The higher-order dimensions may require a longer path through interconnect fabric 40 with several intermediate connections, while a lower-order dimension may make a direct connection.

Figure 5:
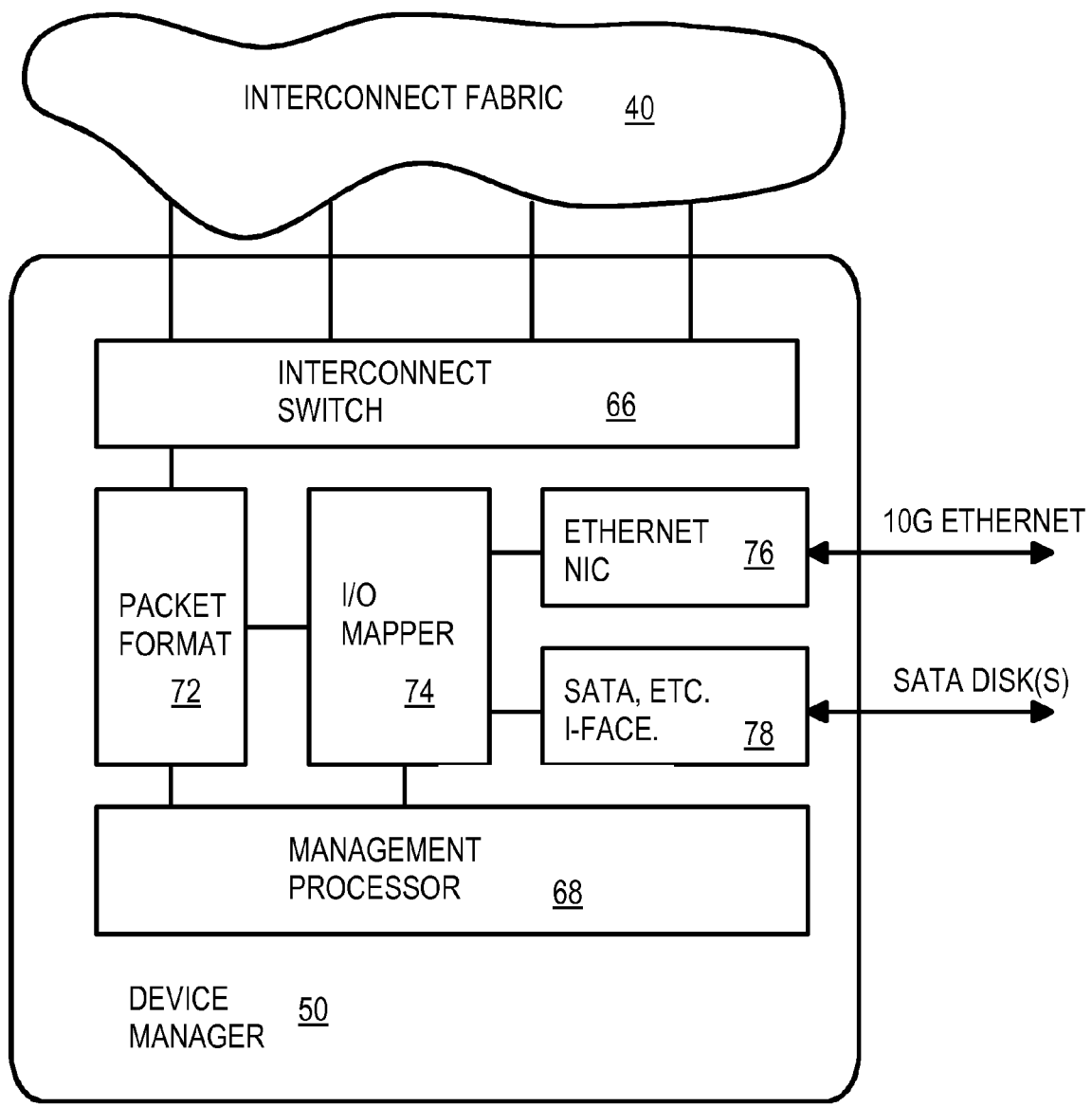
FIG. 5 highlights a device manager for connecting to remote peripherals on a remote peripheral bus.

FIG. 5 highlights a device manager for connecting to remote peripherals on a remote peripheral bus. Device interconnect switch 66 may connect to several dimensions of connections inside interconnect fabric 40. Packets received over interconnect fabric 40 are compared to the interconnect address of device manager 50 and processed when the address matches the interconnect address of device manager 50.

Management processor 68 uses I/O mapper 74 to examine incoming packets and routes the encapsulated request to either remote Ethernet NIC 76 or to remote generic peripheral 78. I/O mapper 74 can access distributed routing table 47 (FIG. 3) to search for a matching mapping entry, or to create a new mapping entry for a new request.

Rather than have an external peripheral bus 38 (FIG. 3), remote Ethernet NIC 76 can be directly accessed within device manager 50, and can connect to an external network such as a 10 G Ethernet link. Likewise, remote generic peripheral 78 can be directly accessed within device manager 50 rather than be located on an external peripheral bus. Remote generic peripheral 78 can directly connect to external hard disks using a SATA bus, or to other peripherals such as a console or BIOS using an external peripheral bus such as a SATA bus that is shared with the hard disks.

Data read from hard disks by remote generic peripheral 78 or from the Ethernet link by remote Ethernet NIC 76 are encapsulated by packet formatter 72 and have the interconnect address of interconnect interface device 44 for the requesting processing node attached using I/O mapper 74. The encapsulated data is sent over interconnect fabric 40 using device interconnect switch 66.

Figure 6:
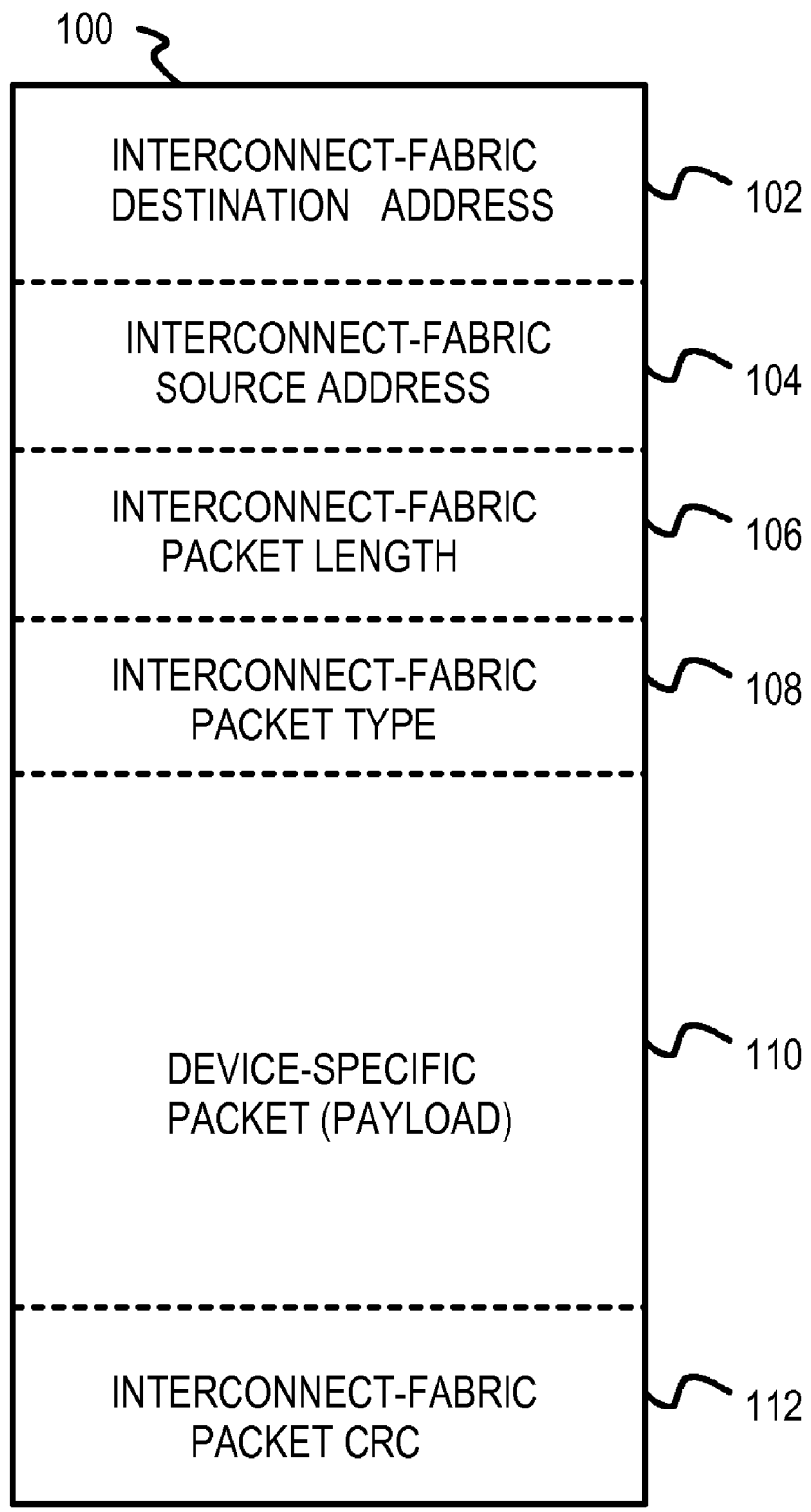
FIG. 6 shows an interconnect packet sent over the interconnect fabric to virtualize remotely-located peripherals.

FIG. 6 shows an interconnect packet sent over the interconnect fabric to virtualize remotely-located peripherals. Interconnect packet 100 encapsulates data payload 110, which may include commands, addresses such as block addresses, and data. This data and its format is device-specific, such as for programming registers in an Ethernet NIC, console, reading BIOS, or accessing sectors of a hard disk.

Destination address 102 is the interconnect address or identifier of the destination, either device manager 50 or interconnect interface device 44. Source address 104 is the interconnect address of the sending device manager 50 for a reply, or the sending interconnect interface device 44 for a processor request. The source address and destination interconnect address are stored as part of the mapping entry for this request-reply flow in distributed routing tables 46, 47.

Length field 106 stores the length of interconnect packet 100, or an indicator of the length. Interconnect packets may have a variety of fixed lengths, or may be variable length in different embodiments.

Packet type field 108 contains an indicator of the packet type. The packet type has one value for an Ethernet peripheral, another value for a hard disk, another value for a console or BIOS, etc. Additional bits or encodings may be used for indicating the direction (fetch or response) as a sub-type of packet for a particular peripheral device.

Checksum field 112 contains a checksum for the packet, such as a cyclic-redundancy check (CRC) or other signature. The checksum can be used for detecting errors in interconnect packet 100. Error correction could also be provided for using a larger field size.

Figure 7:
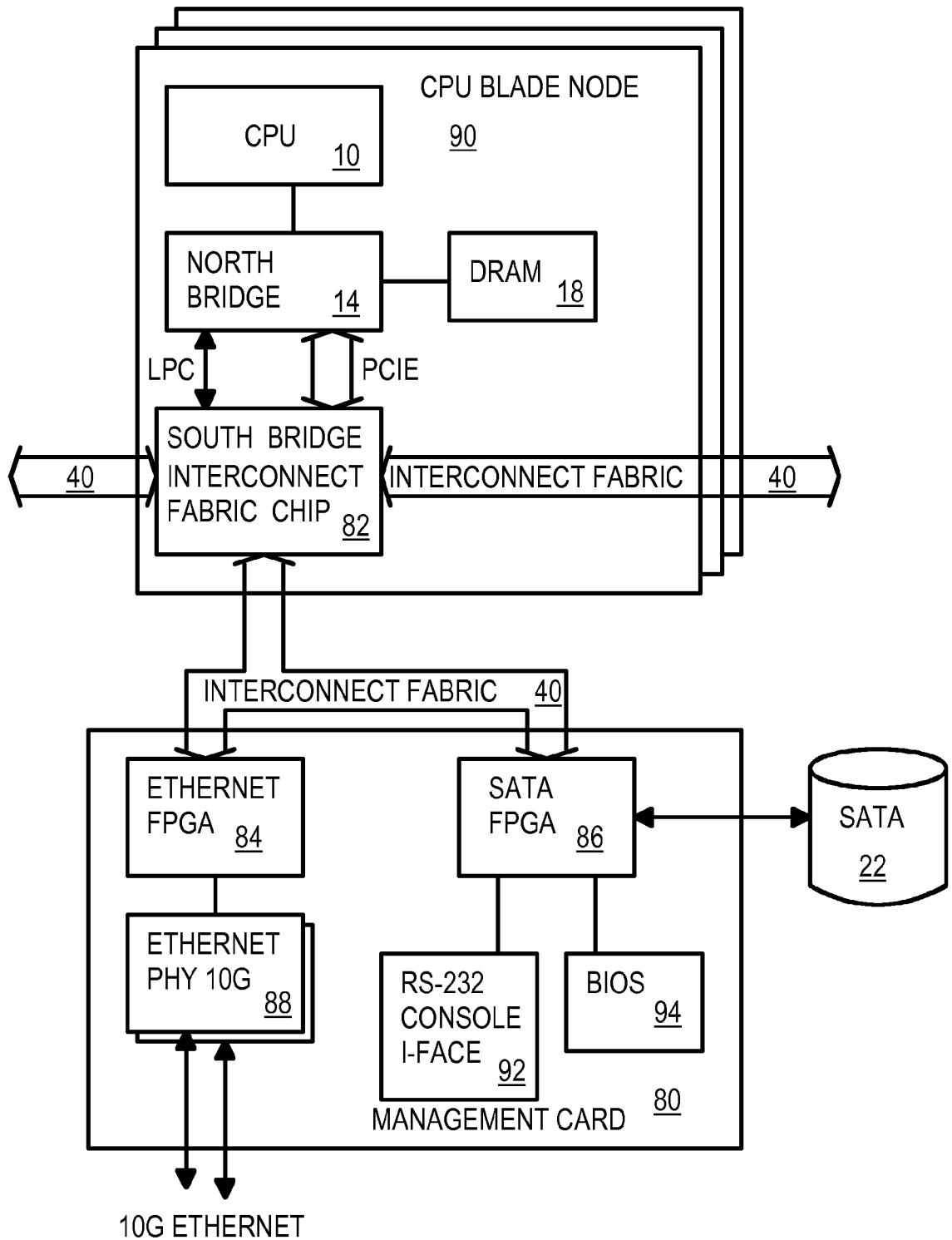
FIG. 7 shows a multi-processor system that shares remote peripheral on a management card through an interconnect fabric.

FIG. 7 shows a multi-processor system that shares remote peripheral on a management card through an interconnect fabric. Several processor nodes share virtualized peripherals located on management card 80.

Interconnect fabric 40 connects to one or more of management card 80. Management card 80 contains one or more Field-Programmable Gate Array (FPGA) chips. Requests are extracted from interconnect packets and are routed to either remote Ethernet FPGA 84 or to SATA FPGA 86, depending on packet type field 108 (of FIG. 6).

Ethernet requests are extracted from the data payloads of Ethernet request packets sent to Ethernet FPGA 84. These Ethernet requests are forwarded to Ethernet controller 88, which reformats requests and sends Ethernet packet through a physical layer that connects to a 10 Giga-bits-per-second Ethernet link. There may be several Ethernet links and controllers connected to Ethernet FPGA 84 when many processor cores share management card 80.

Other types of interconnect packets are sent to SATA FPGA 86. SATA FPGA 86 extracts requests embedded in the data payloads and forwards the requests to the remote peripheral device indicated by the packet type field, or by information in the data payload such as a device address from the processor core, or by the mapping entry from distributed routing table 47 (FIG. 3).

Requests for accessing a hard disk are sent as SATA or IDE requests to hard disks 22. There may be several sub-commands that are sent over a SATA bus to hard disk 22, such as commands to seek a sector, read or write data in that sector, program registers in the hard disk's controller, etc.

Requests for reading or writing the console are sent from SATA FPGA 86 to console interface 92, which may have registers that are written to drive data onto an external serial line, such as a RS-232 interface. Incoming data may be read from the console registers in console interface 92. An external display, storage device, or monitoring host computer may connect to the other end of the RS-232 interface to monitor the multi-processor system.

Requests to read the remote BIOS are converted by SATA FPGA 86 into signals for performing a memory read of remote BIOS 94. An address within BIOS 94 may be generated along with control signals such as a read strobe or output enable signal. The data read from BIOS 94 is encapsulated into an interconnect packet by SATA FPGA 86, and the source interconnect address of management card 80 and the destination interconnect address of the requesting processing node are added by SATA FPGA 86 consulting distributed routing table 47 (FIG. 3).

Figure 1:
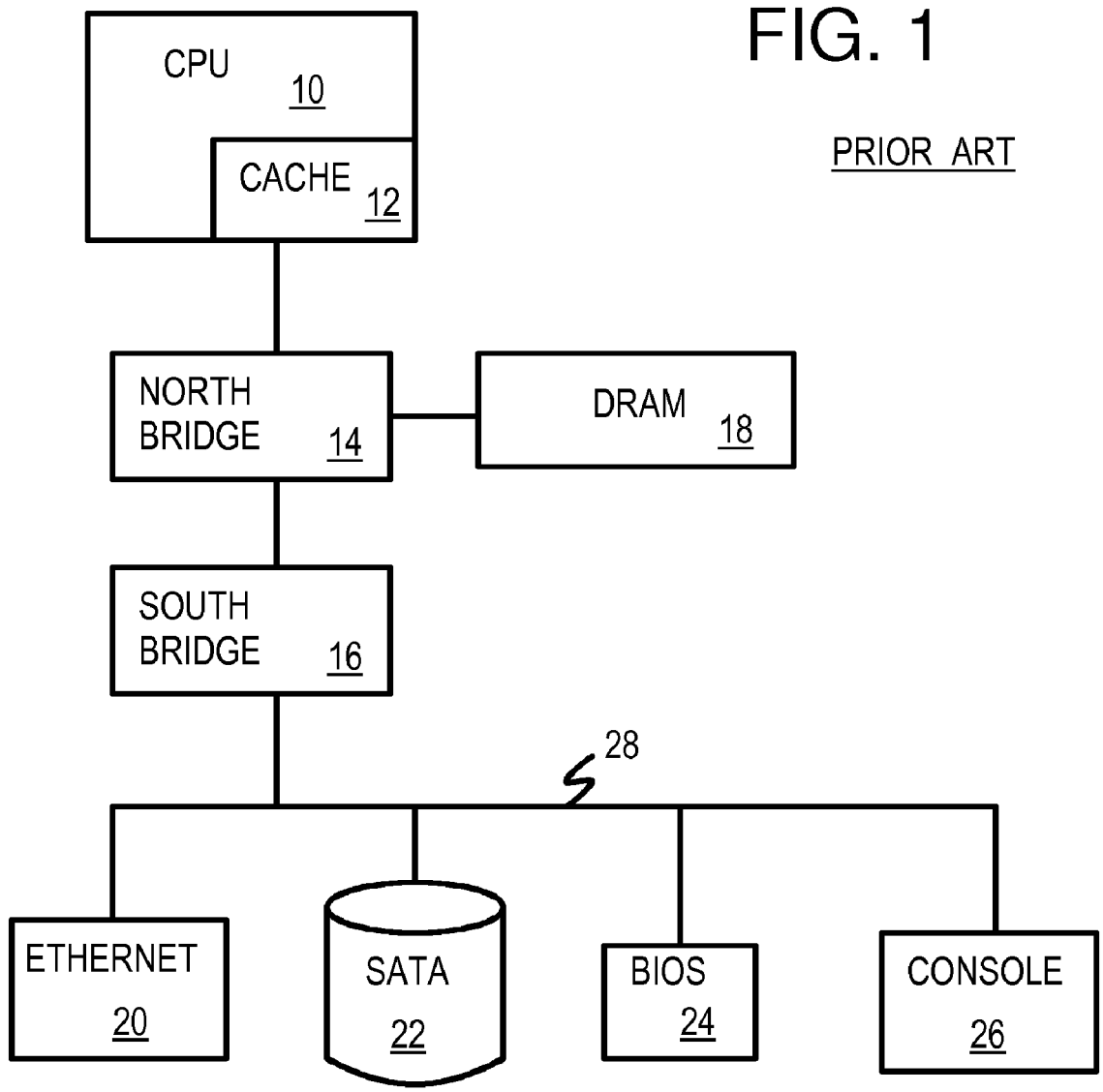
FIG. 1 shows a typical uni-processor computer system.
Figure 2:
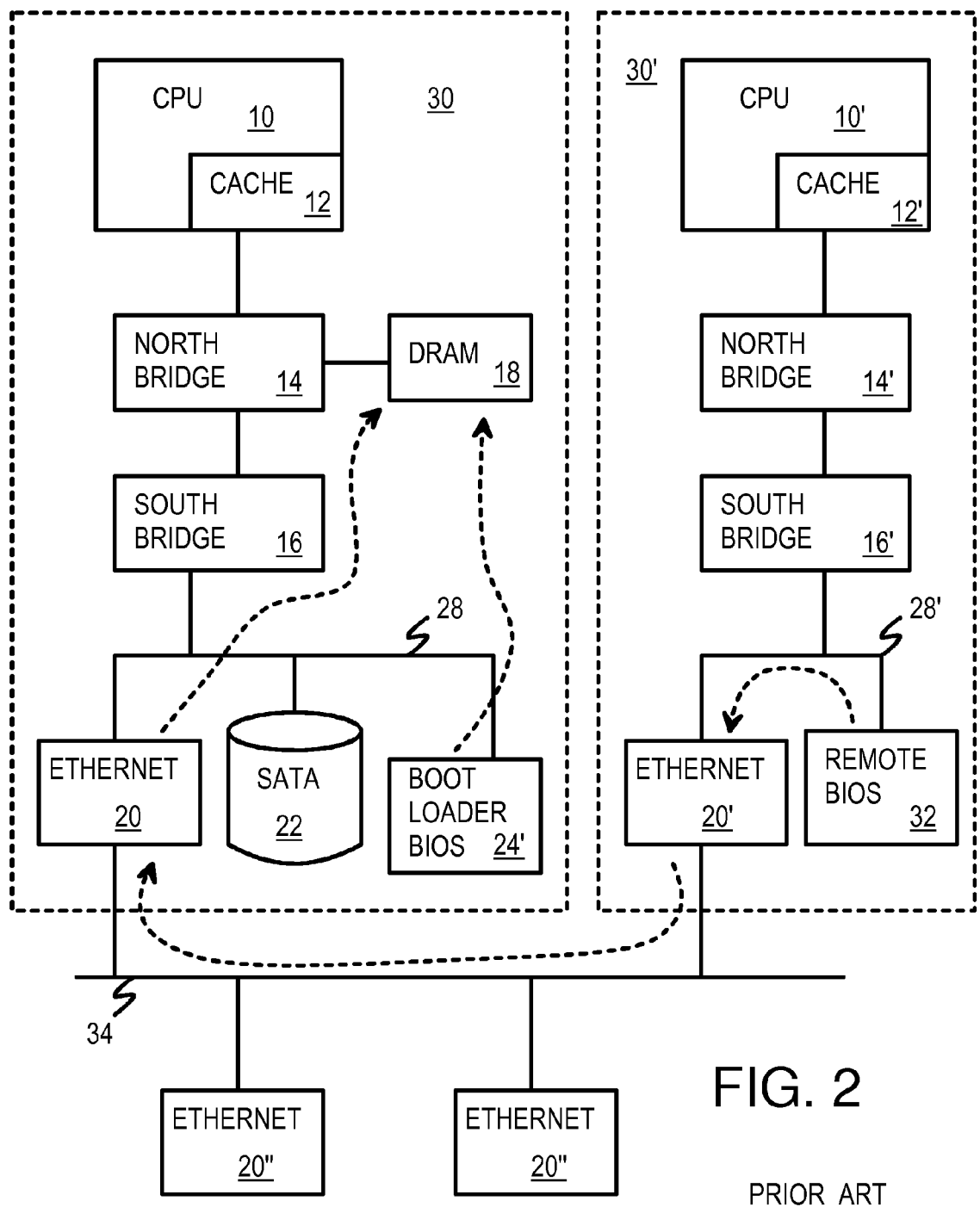
FIG. 2 shows a multi-processing system that shares part of a BIOS.

Data returned over interconnect fabric 40 in interconnect packets are routed through south bridge interconnect fabric chip 82, which contains switches that form part of interconnect fabric 40. South bridge interconnect fabric chip 82 also contains interconnect interface device 44 16 (FIG. 3) and portions of south bridge 16 (FIG. 2). South bridge interconnect fabric chip 82 may connect in several dimensions of the fabric to other south bridge interconnect fabric chips 82 on other CPU blade node cards 90, and then through the other south bridge interconnect fabric chips 82 (not shown) to other management cards 80 (not shown).

South bridge interconnect fabric chip 82 may be located on one of several CPU blade node cards 90 that are connected together through south bridge interconnect fabric chip 82. Thus many CPU's may share one south bridge interconnect fabric chip 82. Each CPU has a separate PCI Express (PCIE) bus that connects to south bridge interconnect fabric chip 82. Alternately, each CPU blade node card 90 may have one south bridge interconnect fabric chip 82 mounted thereon.

CPU 10 on CPU blade node card 90 reads instructions and accesses data in DRAM 18 through north bridge 14. When CPU 10 accesses a peripheral, it sends a request through north bridge 14 over a PCIE bus to south bridge interconnect fabric chip 82. South bridge interconnect fabric chip 82 acts as a south bridge chip, but instead of directly connecting to a local peripheral bus, south bridge interconnect fabric chip 82 encapsulates the requests from CPU 10 into interconnect packets, that are sent over interconnect fabric 40 to management card 80. Management card 80 then accesses a remote peripheral and sends a response such as data back through interconnect fabric 40 to the requesting south bridge interconnect fabric chip 82. The data read from the remote peripheral is extracted from the interconnect packet by south bridge interconnect fabric chip 82 and sent to CPU 10 through north bridge 14.

A Low Pin Count (LPC) bus may also connect north bridge 14 or CPU 10 and south bridge interconnect fabric chip 82. The LPC bus may be used for out-of-channel signaling, setup, and control of south bridge interconnect fabric chip 82.

Figure 8:
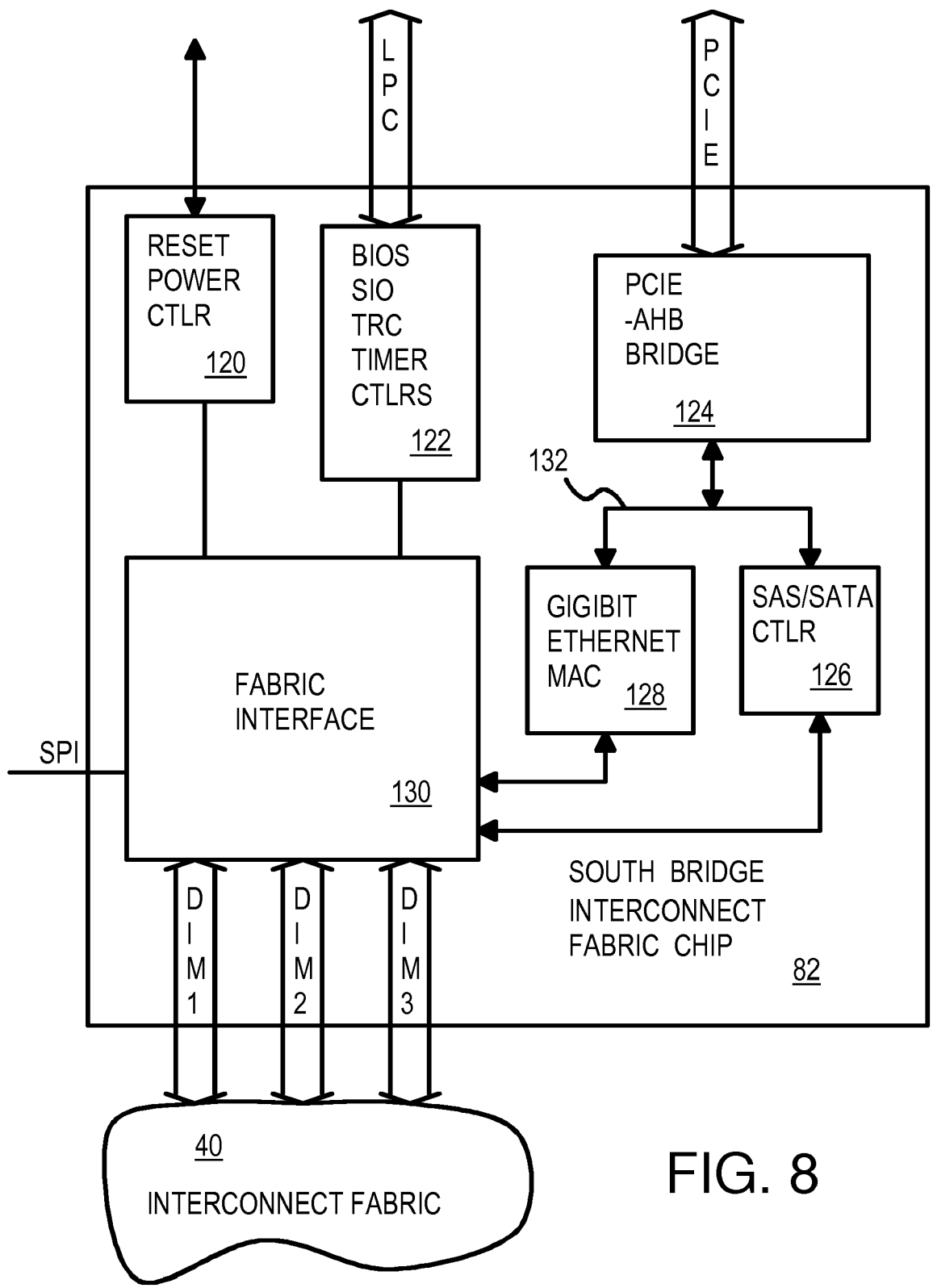
FIG. 8 shows a south bridge interconnect fabric chip in more detail.

FIG. 8 shows a south bridge interconnect fabric chip in more detail. South bridge interconnect fabric chip 82 has fabric interface 130 which contains switches and routing tables or logic to route packets through the fabric toward the packet's destination interconnect address. There may be multiple dimensions of connections from fabric interface 130 to other south bridge interconnect fabric chips 82 and to one or more management cards 80 (FIG. 7).

Requests from the CPU to access virtual peripherals are received over a PCIE bus from north bridge 14 (FIG. 7) by PCIE-AHB bridge 124. PCIE-AHB bridge 124 converts PCIE requests into Advanced High-Performance Bus (AHB) format used by ARM processors. AHB bus 132 connects PCIE-AHB bridge 124 to Ethernet media-access-controller (MAC) 128, which acts as the local endpoint for the CPU's requests while generating interconnect packets sent over interconnect fabric 40 for access of a remote Ethernet NIC.

Non-Ethernet requests are handled by Serial-Attached Small-Computer System Interface/Serial ATA SAS/SATA controller 126 which acts as a local endpoint for PCIE communications from the local CPU. Interconnect packets are formed and sent through fabric interface 130 and 40 requests are handled by SAS/SATA controller 126 which acts as a local endpoint for PCIE communications from the local CPU. Interconnect packets are formed and sent through fabric interface 130 and interconnect fabric 40 to the remote peripheral. The hard disk sector, console, or BIOS data is returned through interconnect fabric 40 to SAS/SATA controller 126, which forms a reply packet that is converted to PCIE by PCIE-AHB bridge 124 and sent back to the local CPU.

The local CPU, either directly or through north bridge 14, has local control signals on a Low Pin Count (LPC) bus. LPC signals are sent to timer controllers 122 on south bridge interconnect fabric chip 82. Timer controllers 122 contain various controllers on a PC, such as a real-time clock (RTC), programmable timers and counters, serial I/O registers, and the virtual side of the BIOS. The virtual side of the BIOS controller responds to local bus requests, but does not store data. Instead, data must be fetched from the remote BIOS image. These controllers may be local, or may be shared using a remote controller on management card 80, such as an integrated peripheral controller (IPC) chip with these timers and controllers.

Reset power controller 120 receives a reset signal from CPU blade node card 90. Fabric interface 130 and other components in south bridge interconnect fabric chip 82 may be reset in response to the external reset signal. An out-of-band bus, such as a Serial Peripheral Interface (SPI) bus or other bus may also connect to south bridge interconnect fabric chip 82 for controlling or testing south bridge interconnect fabric chip 82.

Figure 9:
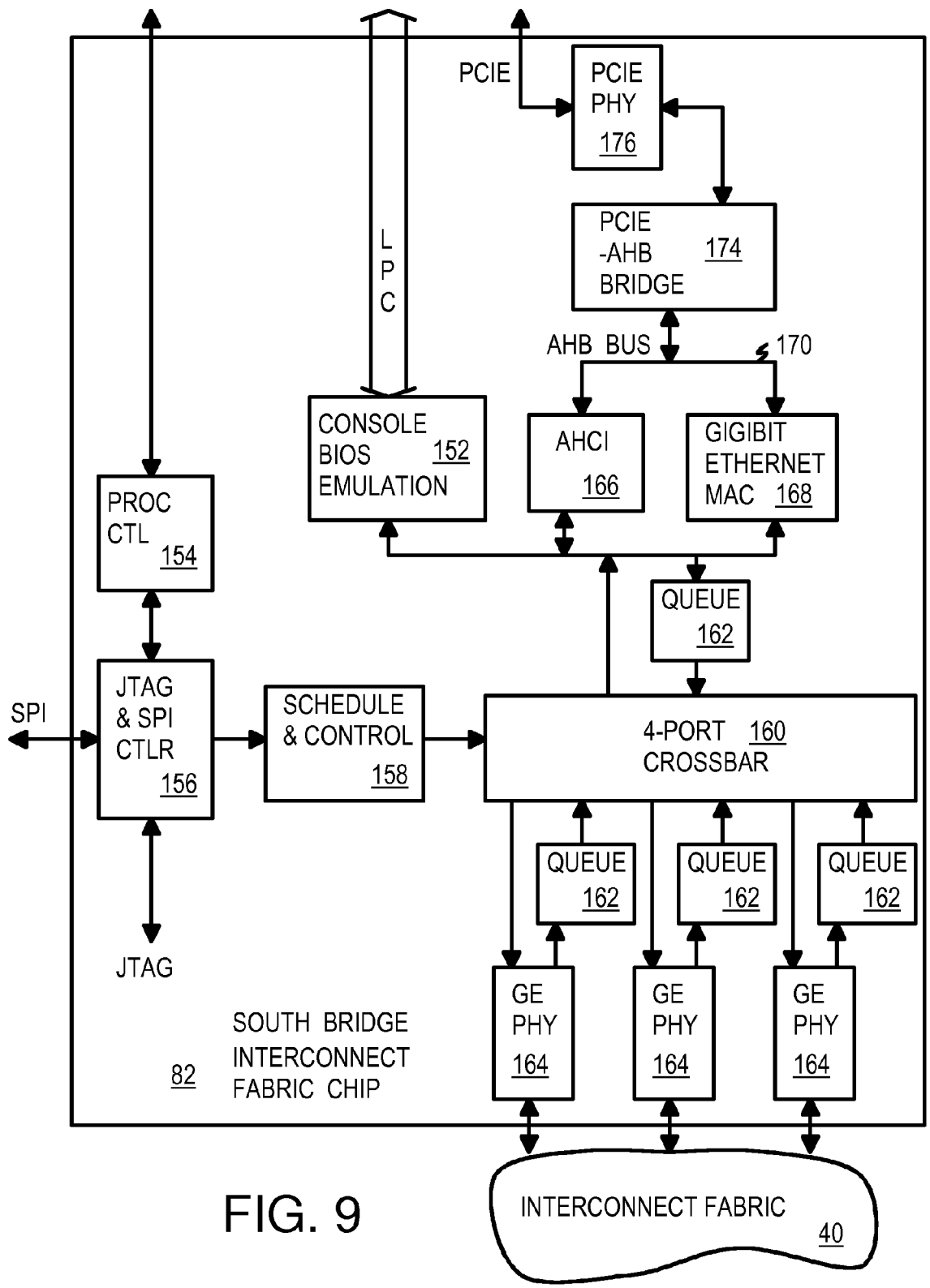
FIG. 9 shows the south bridge interconnect fabric chip in more detail.

FIG. 9 shows the south bridge interconnect fabric chip in more detail. The fabric interface is implemented using 4-port crossbar switch 160, which connects to three external ports and one internal port. Each of the three external ports to interconnect fabric 40 have queue 162 for buffering incoming interconnect packets, and physical layer 164. The physical layer of interconnect fabric 40 can be a Giga-bit Ethernet, or could be other kinds of physical layers, such as PCIE, Rocket IO, Rapid IO, Hyper-Transport, etc.

Control and configuration of 4-port crossbar switch 160 is performed by switch scheduler and controller 158 in response to control commands received from the local CPU by processor controller 154, or from an out-of-band signaling bus or other management bus. JTAG and SPI controller 156 allows JTAG scan testing of south bridge interconnect fabric chip 82 to be performed when SPI commands are not being received.

PCIE requests from local CPU are received by PCIE physical layer 176 and converted to AHB format by PCIE-AHB bridge 174. AHB bus 170 connects to Gigabit Ethernet MAC 168 and a disk host bus adapter such as AHCI, which emulates SATA hard disks and other virtualized peripherals. Console BIOS emulator 152 performs BIOS and console emulation for remote BIOS and remote console peripherals, and may connect directly to LPC, rather than only through PCIE. Queue 162 buffers outgoing interconnect packets to 4-port crossbar switch 160.

Switches in interconnect fabric 40 use cut-through routing rather than store-and-forward routing to decrease switching delays and buffering requirements. Using cut-through routing, 4-port crossbar switch 160 does not have to have large buffers within the fabric since packets are not stored at switch nodes in the fabric.

The remote peripherals appear to the operating system running on the local CPU be on the local peripheral bus on a south bridge chip. However, the south bridge chip is replaced with south bridge interconnect fabric chip 82. South bridge interconnect fabric chip 82 creates interconnect packets that are sent across interconnect fabric 40 to device manager 50, which then accesses a remote peripheral on a remote peripheral bus.

Access of the remote peripheral appears to be taking place on the local processor's own peripheral bus, while in fact the remote peripheral is on a shared, remote peripheral bus. The local CPU's operating system sees the remote peripheral as being on its own local peripheral bus. The remote peripheral is virtualized to the local CPU's own peripheral bus. South bridge interconnect fabric chip 82 contains hardware that virtualizes access to remote peripherals. For example, virtual Ethernet NIC 56 and virtual generic peripheral 58 in interconnect interface device 44 act as virtual endpoints of the local CPU's peripheral bus (FIG. 4), yet the actual data is accessed by remote Ethernet NIC 76 or remote generic peripheral 78 on device manager 50 (FIG. 5).

Alternate Embodiments

Several other embodiments are contemplated by the inventors. For example various operating systems could be run on the CPU's, such as Windows, Linux, etc. Some CPU's may run one OS, while other CPU's may run another OS.

Special drivers for accessing the remote peripherals do not need to be run on the local CPU's. There may be some software on the local CPU to control switches in interconnect fabric 40 or south bridge interconnect fabric chip 82, but this software is not activated when accessing remote peripherals. Thus access of remote peripherals is fast and transparent to applications and the operating system running on the local CPU.

The local peripheral bus between north bridge 14 and south bridge interconnect fabric chip 82 may be a PCI bus, a PCIE bus, an AT bus, a SATA bus, Serial Peripheral Interface (SPI), $I^2C$ bus, SM bus, IDE bus, SAS, proprietary bus, or other bus. Likewise, the remote peripheral bus may be a PCI bus, a PCIE bus, an AT bus, a SATA bus, Serial Peripheral Interface (SPI), $I^2C$ bus, SM bus, IDE bus, SAS, proprietary bus, or other kind of expansion bus. Some device managers 50 may connect to one kind of peripheral bus, such as PCIE, while other device managers 50 may connect to other kinds of peripheral buses, such as USB. Some device managers 50 may have multiple bus controllers, and be able to access several buses of different protocols. Multiple channels and simultaneous access of multiple buses may be supported by some device managers 50. A large system may have hundreds or thousands of CPU's and shared peripherals.

Rather than have one remote peripheral bus 38 per device manager 50, there may be several remote buses, such as shown in FIG. 5, where the SATA and Ethernet controllers have separate buses to I/O mapper 74.

Various kinds of bus links could be used within interconnect fabric 40. High-speed serial links in interconnect fabric 40 may be PCIE, Rapid IO, Rocket IO, Hyper-Transport, or some other protocol, and future protocols and enhancements may be substituted. The interconnect fabric may have one dimension or may have multiple dimensions. The interconnect fabric may be a hyper-cube, a torus, and multi-dimensional torus, a tree, a fat tree, or a generalized hypercube, or some other topology. Interconnect packets may have additional fields and may vary in format.

Remote peripherals may include hard disks such as SATA/SAS or IDE disks, Ethernet NIC's, BIOS memory with boot code or some other code or data, consoles, fiber channel disks and connections, shared clean memory pages, serial COM devices, virtual USB devices, etc. A wide variety of peripherals may be virtualized using the invention. Rather than simply virtualizing one kind of peripheral, such as only Ethernet or only BIOS, the invention generically virtualizes a wide variety of peripheral devices in a consistent way. Thus the invention can expand to include new peripherals devices that are developed in the future, increasing the lifetime of the system. The system with virtualized peripherals does not become obsolete when new peripherals are developed. Even new peripheral buses may be supported by adding a new device manager 50 for that new peripheral bus to an older system.

Some local peripherals could be allowed on the local peripheral bus, and south bridge interconnect fabric chip 82 may have some local peripherals, such as a real time clock, timers, DMA, etc. Plug-in peripherals may not be supported for the local processor cores, or may be used only for testing or monitoring, such as by having a plug on the local peripheral bus for use during diagnostic testing.

While 10 G Ethernet has been described, other Ethernets could be used, such as 100 M, 10 M, or future Ethernets such as 100 G. Rather than use Ethernet, other networks could be substituted, or a generalized network interface controller (NIC) used. A multi-network controller could also be used.

In general, BIOS and console requests could go to either FPGA or even to a separate chip. Alternately, all of these blocks could be put in one chip.

Rather than use FPGA chips, other kinds of logic could be used, such as custom-logic chips, mask-programmable gate arrays, Application-Specific Integrated Circuits (ASICs), gate arrays, programmable logic, etc. Ethernet FPGA 84 and SATA FPGA 86 could be combined into one large chip, or may be divided into separate chips or combined with other function chips. While a 4-port crossbar switch 160 has been described, crossbar switch 160 may have more or less than 4 ports, such as 7 ports, 8 ports, etc.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A peripheral-sharing multi-computer system comprising:
    a plurality of processor cores, each processor core comprising:
        a processor for executing instructions and generating requests to access peripherals;
        a main memory for storing instructions executed and data used by the processor;
        a local peripheral bus that carries the requests to access virtualized peripherals;
    a plurality of interconnect interface devices, coupled to the plurality of processor cores, comprising hardware functioning as virtual endpoints for the requests to access virtualized peripherals from the processor, wherein the virtual peripherals appear to be on the local peripheral bus from a point of view of software executing on the processor;
    an interconnect fabric coupled to the plurality of interconnect interface devices and carrying interconnect packets containing the requests to access peripherals generated by the plurality of processing cores;
    a plurality of remote peripheral buses;
    a plurality of remote peripherals on the plurality of remote peripheral buses, the plurality of remote peripherals comprising at least two of:
        a Network Interface Card (NIC), a hard disk controller for accessing a hard disk, a Basic Input Output System (BIOS) memory, and a console;
    a plurality of device managers, coupled to the interconnect fabric, for sending the requests to access peripherals contained in the interconnect packets over the plurality of remote peripheral buses to the plurality of remote peripherals, and for receiving reply data from the plurality of remote peripherals and sending the reply data in interconnect packets to the plurality of interconnect devices to respond to the requests to access peripherals, whereby remote peripherals are accessed remotely through the interconnect fabric and virtualized peripherals appear to be on the local peripheral bus from the point of view of software executing on the processor.

2. The peripheral-sharing multi-computer system of claim 1 wherein the plurality of remote peripherals comprises at least three of:
a Network Interface Card (NIC), a hard disk controller for accessing a hard disk, a Basic Input Output System (BIOS) memory, and a console,
whereby remote peripherals are shared among the plurality of processor cores.

3. The peripheral-sharing multi-computer system of claim 1 wherein each of the plurality of remote peripheral buses is attached to at least two of:
a Network Interface Card (NIC), a hard disk controller for accessing a hard disk, a Basic Input Output System (BIOS) memory, and a console.

4. The peripheral-sharing multi-computer system of claim 1 wherein the plurality of remote peripherals comprises the BIOS memory that stores boot code;
wherein the boot code is read from the BIOS memory through the interconnect fabric when the processor is initialized or reset, the processor accessing the BIOS on a remote peripheral bus using local commands on the local peripheral bus;
wherein the BIOS memory appears to be located on the local peripheral bus to the processor during booting,
whereby boot code located on the remote peripheral bus is virtualized and accessible using local commands on the local peripheral bus.

5. The peripheral-sharing multi-computer system of claim 1 further comprising:
a distributed routing table coupled to an interconnect interface device in the plurality of interconnect interface devices, the distributed routing table storing mapping entries, the mapping entries containing mappings of local addresses on the local peripheral bus to interconnect addresses that identify device managers coupled to remote peripheral buses attached to remote peripherals that are virtually addressed by the requests to access peripherals.

6. The peripheral-sharing multi-computer system of claim 5 further comprising:
a device distributed routing table coupled to a device manager in the plurality of device managers, the device distributed routing table storing return mapping entries, the return mapping entries each identifying a requesting interconnect interface device in the plurality of interconnect interface devices that is coupled to a processor generating a request received by the device manager.

7. The peripheral-sharing multi-computer system of claim 1 wherein the interconnect fabric comprises a torus, a hypercube, or a multi-dimensional fabric of cut-through switches that do not store entire interconnect packets at intermediate nodes in the interconnect fabric.

8. The peripheral-sharing multi-computer system of claim 1 wherein each processor core further comprises:
a north bridge that couples the processor to the main memory, and that drives the local peripheral bus;
wherein an interconnect interface device in the plurality of interconnect interface devices is a south bridge interconnect fabric chip that emulates a south bridge that is coupled to the north bridge, and also generates the interconnect packets sent over the interconnect fabric to access the plurality of remote peripherals on the plurality of remote peripheral buses.

9. The peripheral-sharing multi-computer system of claim 8 wherein the south bridge interconnect fabric chip comprises:
a virtual NIC comprising hardware functioning as the virtual endpoint to the processor when the request to access peripherals is a request to access a network;
a virtual generic peripheral comprising hardware functioning as the virtual endpoint to the processor when the request to access peripherals is a not the request to access the network; and
a packet formatter for encapsulating the requests to access peripherals into the interconnect packets for transmission over the interconnect fabric.

10. The peripheral-sharing multi-computer system of claim 9 wherein the south bridge interconnect fabric chip comprises:
a multi-port crossbar switch having links that connect to other south bridge interconnect fabric chips for other processing cores, and to a device manager in the plurality of device managers,
whereby the south bridge interconnect fabric chip connects to the device manager and to other south bridge interconnect fabric chips.

11. The peripheral-sharing multi-computer system of claim 10 wherein the plurality of remote peripherals on a first remote peripheral bus comprises:
a first Network Interface Card (NIC);
a first hard disk controller for accessing a hard disk,
a first Basic Input Output System (BIOS) memory, and
a first console;
wherein the plurality of remote peripherals on a second remote peripheral bus comprises:
a second Network Interface Card (NIC);
a second hard disk controller for accessing a hard disk,
a second Basic Input Output System (BIOS) memory, and
a second console.

12. The peripheral-sharing multi-computer system of claim 11 wherein the first NIC and the second NIC comprise Ethernet NIC's that connect to Ethernet network links.

13. A peripheral-virtualizing south bridge interconnect fabric chip comprising:
an I/O bus interface for physically interfacing to a local peripheral bus, the local peripheral bus connecting to a processor and to a main memory through a north bridge chip;
a virtual network controller comprising hardware functioning as a virtual endpoint for network protocol requests from the processor to access a network-interface card;
a virtual generic peripheral controller comprising hardware functioning as a virtual endpoint for generic requests from the processor to access a virtualized local peripheral;
wherein the virtualized local peripheral appears to be located on the local peripheral bus and is addressable on the local peripheral bus by unmodified software running on the processor that is not modified for virtualizing accesses of peripheral devices;
an I/O mapper that maps the network protocol requests from the processor to a first interconnect address, and that maps the generic requests from the processor to a second interconnect address;
a packet formatter that encapsulates the network protocol requests into interconnect packets, and that encapsulates the generic requests into interconnect packets; and
a fabric interface that sends and receives interconnect packets over an interconnect fabric to a device manager;
wherein the device manager is coupled to a first remote peripheral bus that has a remote Network Interface Card (NIC) that connects to an external network, and a remote generic peripheral;
whereby remote peripherals on the first remote peripheral bus are accessed virtually through the interconnect fabric using virtual endpoints on the local peripheral bus.

14. The peripheral-virtualizing south bridge interconnect fabric chip of claim 13 wherein the I/O mapper comprises a distributed routing table with mapping entries and wherein the fabric interface comprises a multi-port crossbar switch.

15. The peripheral-virtualizing south bridge interconnect fabric chip of claim 14 wherein the multi-port crossbar switch comprises:
a plurality of physical layer interfaces connected in a multi-dimensional fabric to the device manager and to other nodes in the interconnect fabric,
whereby the interconnect fabric is a multi-dimensional fabric.

16. The peripheral-virtualizing south bridge interconnect fabric chip of claim 13 further comprising:
a timer controller that is accessible by the processor, the timer controller having programmable timers and a real-time-clock for use by the processor.

17. The peripheral-virtualizing south bridge interconnect fabric chip of claim 13 wherein the remote generic peripheral reads and writes an external hard disk and accesses a remote Basic Input Output System (BIOS) memory.

18. The peripheral-virtualizing south bridge interconnect fabric chip of claim 13 wherein the remote network controller is an Ethernet controller, the network protocol requests are Ethernet protocol requests, and the NIC is an Ethernet NIC.

19. A multi-computer system with shared remote peripherals comprising:
a plurality of Central Processing Unit (CPU) blade node cards;
a plurality of management cards;
an interconnect fabric that connects the plurality of CPU blade node cards to each other and to the plurality of management cards, the interconnect fabric being a multi-dimensional fabric carrying interconnect packets;
wherein each CPU blade node card in the plurality of CPU blade node cards comprises:
a CPU that executes instructions and generates peripheral requests;
a main memory for storing instructions executed by the CPU;
a local peripheral bus;
a north bridge that couples the main memory to the CPU, and drives the local peripheral bus with the peripheral requests generated by the CPU;
a south bridge interconnect fabric chip that comprises:
an I/O bus interface for physically interfacing to the local peripheral bus;
a virtual network controller comprising hardware functioning as a virtual endpoint for network-protocol requests from the CPU to access a network;
a virtual generic peripheral controller comprising hardware functioning as a virtual endpoint for generic requests from the CPU to access a virtualized local peripheral;
wherein the virtualized local peripheral appears to be located on the local peripheral bus and is addressable on the local peripheral bus by unmodified software running on the CPU that is not modified for virtualizing accesses of peripheral devices;
an I/O mapper that maps the network-protocol requests from the CPU to a first interconnect address, and that maps the generic requests from the CPU to a second interconnect address;
a packet formatter that encapsulates the network-protocol requests into interconnect packets, and that encapsulates the generic requests into interconnect packets; and
a fabric interface that sends and receives interconnect packets over the interconnect fabric;
wherein a first management card in the plurality of management cards comprises:
an interconnect switch for sending and receiving interconnect packets from the interconnect fabric;
a remote packet formatter for extracting the network-protocol requests and the generic requests from the interconnect packets, and for encapsulating reply data into interconnect packets sent back to the CPU blade node cards through the interconnect fabric;
a remote network interface card that receives the network-protocol requests from the remote packet formatter, and sends and receives network packets over an external network in response to the network-protocol requests, and generates reply data received from the external network; and
a remote generic peripheral controller that receives the generic requests from the remote packet formatter, the remote generic peripheral controller accessing a hard disk to generate the reply data in response to generic requests to access the hard disk,
whereby remote peripherals are shared among the CPU blade node cards.

20. The multi-computer system with shared remote peripherals of claim 19 further comprising:
a remote Basic Input Output System (BIOS) coupled to the remote generic peripheral controller, for supplying boot code as the reply data; and
a console coupled to the remote generic peripheral controller, for writing status data to a serial console interface.

* * * * *